United States Patent [19]

Sennewald et al.

[11] 3,761,513
[45] Sept. 25, 1973

[54] PROCESS FOR THE MANUFACTURE OF VINYL ACETATE

[75] Inventors: Kurt Sennewald; Wilhelm Vogt, both of Knapsack near Cologne; Hermann Glaser, Lechenich, all of Germany

[73] Assignee: Knapsack Aktiengesellschaft, Knapsack near Cologne, Germany

[22] Filed: Apr. 14, 1969

[21] Appl. No.: 816,121

Related U.S. Application Data

[63] Continuation-in-part of Ser. No. 553,721, May 31, 1966, abandoned.

[30] Foreign Application Priority Data

June 25, 1965 Germany............................ K 56472
July 20, 1965 Germany............................ K 56658
Apr. 1, 1966 Germany............................ K 58898

[52] U.S. Cl............................................. 260/497 A
[51] Int. Cl....................... C07c 67/04, C07c 69/14
[58] Field of Search.......... 260/497 A, 476, 410.9 A

[56] References Cited
UNITED STATES PATENTS 3,190,912  6/1965  Robinson............................ 260/497

FOREIGN PATENTS OR APPLICATIONS 1,407,526  6/1965  France................................. 260/497
618,071  9/1962  Belgium.............................. 260/497
648,814  12/1964  Belgium.............................. 260/497
638,489  2/1964  Belgium.............................. 260/497

*Primary Examiner*—Lorraine A. Weinberger
*Assistant Examiner*—Richard D. Kelly
*Attorney*—Curtis, Morris and Safford

[57] ABSTRACT

An improved process for the catalytic, vapor phase production of vinyl acetate from ethylene, acetic acid and molecular oxygen is shown. A catalyst for the synthesis reaction comprising metallic palladium and an alkali metal acetate or formate supported on an inert carrier is activated by including metallic gold therein. A preferred catalyst composition which shows substantially improved operating characteristics includes metallic palladium, an alkali metal acetate and metallic gold. Another preferred catalyst composition includes a low melting mixture of at least two alkali metal acetates.

8 Claims, No Drawings

PROCESS FOR THE MANUFACTURE OF VINYL ACETATE

This application is a continuation-in-part of application Ser. No. 553,721, filed on May 31, 1966, now abandoned; and relates to a process for the manufacture of vinyl acetate from ethylene, acetic acid and molecular oxygen or air in the gas phase in contact with a carrier catalyst containing metallic palladium and an alkali metal salt, e.g. an alkali metal or alkaline earth metal acetate.

It is known that vinyl acetate can be prepared by reacting the starting materials named above, at a temperature between 120° and 250°C, preferably between 150° and 200°C, under a pressure between one and 10 atmospheres absolute, in contact with a carrier catalyst which contains either pure palladium or palladium and other metals belonging to group 8 of the Periodic System in combination with elements which exist in various stages of valency and therefore enable the metals of group 8 to be oxidized intermediarily to the ionic state. These catalysts, which are rather costly owing to their relatively high content in noble metals, often produce no satisfactory space/time yields which alone would warrant their use in commercial operations, and they have a durability unattractive especially for prolonged operation.

U.S. Pat. No. 3,190,912 describes a vapor phase process for the preparation of unsaturated esters, wherein the preferred catalysts are palladium or palladium salts which can be activated using about one to 10 equivalents of a metal halide promoter per equivalent of catalyst. The preferred metal halide promoters include cupric and ferric salts (Examples X and XIV); gold chloride is mentioned therein amongst quite a number of further metal chlorides (column 2, lines 39 – 51). The catalysts used in Examples I to XVIII inclusive produce extremely low vinyl acetate yields; the . In Example 12 hereinafter it will be shown that metallic iron and nickel in the palladium-containing catalyst used in accordance with the present invention fail to act as promoters.

Belgian Patent No. 648,814 describes a process for the manufacture especially of vinyl acetate by reacting ethylene, oxygen and acetic acid in the gas phase in the presence of a palladium carrier catalyst which preferably contains alumina as the carrier, and alkali metal or alkaline earth metal acetates. The acetates, e.g. of lithium, sodium, potassium, magnesium and calcium, are used in a proportion of one to 20 percent by weight, referred to the weight of the carrier. As taught in Example 1b of that patent, the catalyst contains 2 percent by weight palladium (reduction of $PdCl_2$ with hydrazine) and 1 percent by weight lithium acetate. Vinyl acetate is obtained in a yield of 47.5 grams per liter of catalyst per hour. 57.3 grams vinyl acetate are obtained per liter of catalyst per hour when the catalyst contains 20 percent by weight lithium acetate as shown in Example 1c of the above patent.

Belgian Patent No. 638,489 describes a process for making vinyl esters from fatty acids in contact with carrier catalysts containing palladium, platinum, rhodium, ruthenium or iridium and activated by means of copper, silver, zinc, cadmium, tin, lead, chromium, molybdenum, tungsten, iron, cobalt or nickel. Working Example 1 in that patent describes more especially the manufacture of vinyl acetate in contact with a Pd-Cu active carbon-catalyst which contains 8.66 percent by weight Pd and 5.45 percent by weight Cu and has been obtained by reducing $PdCl_2$ and $CuCl_2 \cdot 2 H_2O$ by means of hydrogen in the presence of active carbon. It can readily be determined that this catalyst which is very costly owing to its high Pd-content enables no more than a space/time yield of 23 grams vinyl acetate per liter of catalyst per hour to be obtained.

The present invention now unexpectedly provides a process for making vinyl acetate from ethylene, acetic acid and molecular oxygen or air in the gas phase in contact with a carrier catalyst containing metallic palladium and an alkali metal formate or acetate, wherein the carrier catalyst is a catalyst activated by means of metallic gold. The carrier catalyst should contain 0.1 to 6.0, preferably 0.5 to 2.0 percent by weight palladium, 0.01 to 1.0, preferably 0.03 to 0.1 percent by weight gold and 1 to 20, preferably about 2 percent by weight alkali metal formate or acetate.

The palladium and gold-containing carrier catalyst is conveniently prepared by reducing a palladium salt and a gold salt or a gold complex compound to metallic palladium and metallic gold in the presence of a carrier. The reducing agents include hydrazine hydrate, alkali metal formate/formic acid, sodium boronate ($NaBH_4$), hydroquinone or hydrogen. The carrier is preferably silicic acid or aluminum oxide or silicate, aluminum phosphate, pumice, asbestos or active carbon.

For a Pd- and Au-content as low as 1 percent and 0.04 percent by weight, respectively, which keeps the catalyst price low, the catalyst according to this invention is found to have an activity or to produce a space/time yield of 50 grams vinyl acetate per liter of catalyst per hour. The apparent density of the catalyst of the present invention being as low as 0.39 kg/liter, it is found that 12.8 grams vinyl acetate will be obtained per hour per gram Pd. As compared with other processes, the quantity of vinyl acetate produced per gram Pd per hour is found to be substantially higher. This means a considerable advance in the art. The catalyst activity remains constant over long periods of time.

It is generally known how such catalysts are prepared. One of the catalyst carriers named above is impregnated with an aqueous solution of a palladium salt, e.g. $PdCl_2$, $Pd(NO_3)_2$ or $Pd(CH_3COO)_2$, and of a gold salt, e.g. $AuCl_3$ or tetrachloroauric (III)-acid ($H[AuCl_4] \cdot 4 H_2O$), and the resulting mixture is evaporated to dryness. The mass so obtained is introduced then into an aqueous solution containing an appropriate reducing agent, e.g. hydrazine, capable of reducing both the palladium and gold salts to the metallic state. Once the reduction is complete, the catalyst mass is removed from the liquid by filtration, and washed with water.

When the reduction was achieved by means of a reducing agent free from alkali, e.g. hydrazine, the catalyst is conveniently impregnated with an about 10 percent solution of sodium acetate. The formates or acetates of lithium or potassium can also be used. The catalyst is dried subsequently and is then ready for use. In the absence of such treatment, despite the gold it contains, the catalyst is found to have a substantially lower activity, e.g. of only 15 grams vinyl acetate per liter of catalyst per hour, instead of the 50 gram or - as shown below - the 90– 120 gram vinyl acetate yield obtained per liter of catalyst per hour. Catalysts which have been reduced by means of a composition comprising sodium formate and formic acid are found to be active even if no sodium acetate has been added thereto.

The carrier materials generally should have an active surface area of 50 to 400 square meters/gram. The carrier is preferably silicic acid having an active surface area e.g. of 180 square meters/gram, determined by the BET-method, and an apparent density e.g. of 0.39 kg/liter. Silicic acid is preferred to other carriers, such as silicates or aluminum oxide, as the silicic acid absolutely resists the action of acetic acid present in the reaction gas.

The catalyst prepared in the manner set forth above is placed into a reaction tube 25 mm wide and a mixture outside the limits of explosion and formed e.g. of 50 percent by volume ethylene, 30 percent by volume air and 20 percent by volume acetic acid in vapor form is caused to travel through the reaction tube at a temperature within the range of 150° to 220°C, preferably 170° to 195°C, and under a pressure between 1 and 10 atmospheres absolute. A catalyst containing as little as 1 percent by weight Pd, 0.04 percent by weight gold and in addition thereto 1 to 20, preferably about 1 to 4 percent by weight alkali metal acetate deposited on a silicic acid carrier, enables under these conditions and under an operating pressure of six atmospheres absolute a space/time yield of 50 grams vinyl acetate to be obtained per liter of catalyst per hour. As compared therewith, a catalyst prepared in analogous manner, save that it contains 4 % Pd but no gold, produces, after activation by means of air and nitrogen at 170°C, a space/time yield of only 22 grams vinyl acetate per liter of catalyst per hour. The same catalyst, when charged with a mixture of ethylene, acetic acid and oxygen in the absence of nitrogen even fails to produce detectable traces of vinyl acetate. In contrast therewith, as shown in Example 3 below, the palladium-gold catalyst of this invention need not be activated by means of air and/or nitrogen at 170°C.

The present invention also relates to a process for making vinyl acetate from ethylene, acetic acid and molecular oxygen or air in the gas phase in contact with a carrier catalyst containing metallic palladium and an alkali metal salt, the catalyst having been activated by means of metallic gold and containing 1 to about 40, preferably 10 to 30 atom percent gold, referred to the gram atoms palladium plus gold.

In U.S. Pat. No. 3,190,912 referred to hereinabove it is suggested that at least 50 atom percent promoter (no metallic gold is suggested therein for use as a promoter), based upon the total atoms of palladium and promoter, be used in order just to produce a promoter effect. In the present invention, however, it would be uneconomic (high gold price) and technically even disadvantageous to use more than about 40 atom percent metallic gold. This can very readily be deduced from working Examples 6, 7 and 8. It is here interesting to note that Example 7 using 30 atom percent gold produces a space/time yield of 120 grams vinyl acetate per liter of catalyst per hour, and that Example 6 using 40 atom percent gold produces up to 110 grams vinyl acetate per liter of catalyst per hour, whereas Example 8, which is given for the purpose of comparison only and uses 50 atom percent gold, produces no more than up to 93 grams vinyl acetate per liter of catalyst per hour.

As compared with the process just described above, it has unexpectedly been found that the preferred gold content of the catalyst need not be limited to 0.01 to 1.0, or more especially 0.03 to 0.1 percent by weight, and that catalysts containing more than 1.0 up to 10 percent by weight gold also permit obtaining very high space/time yields of vinyl acetate. In other words, a carrier catalyst containing 0.1 to 6.0, preferably 0.5 to 2.0 percent by weight palladium, more than 1.0 up to 10 percent by weight gold, and 1 to 20, preferably up to about 5 percent by weight of an alkali metal in the form of an alkali metal salt, e.g. formate or acetate, can also be used in the process of the present invention. Such palladium- and gold-containing carrier catalyst again is prepared by reducing a palladium salt and a gold salt or a gold complex compound to metallic palladium and metallic gold in the presence of a carrier.

The present invention finally relates to a process for making vinyl acetate from ethylene, acetic acid and molecular oxygen or air in the gas phase in contact with a carrier catalyst containing metallic palladium, metallic gold and an alkali metal acetate, wherein the carrier catalyst preferably contains low-melting mixtures of sodium and/or potassium and/or rubidium and/or cesium acetates.

The catalyst may contain altogether 0.1 to 6, preferably 0.2 to 2 percent by weight palladium, 0.01 to 10, preferably 0.1 to 7.5 and more specifically 0.1 to 4.75 percent by weight gold and 0.5 to 5 percent by weight each of sodium and/or potassium and/or rubidium and/or cesium in the form of their acetates. A special feature of the present invention comprises using a carrier catalyst which contains a eutectic mixture of at least two of the alkali metal acetates named above. The carrier catalyst preferably contains sodium acetate and potassium acetate in a molar ratio of about 1 : 1, and the carrier again is more especially silicic acid ($SiO_2$) or aluminum oxide, aluminum silicate, aluminum phosphate, pumice, asbestos or active carbon.

It has unexpectedly been found that the vinyl acetate space/time yields and more particularly the lifetime of the carrier catalyst until regeneration thereof can substantially be increased when the catalyst is impregnated with a solution prepared from a mixture of various acetates of the metals Na, K, Rb or Cs to replace impregnation with a solution of a single alkali metal acetate.

The low melting point of the alkali metal acetate mixtures named above obviously contributes to some extent to the catalyst activity, lower mixed melting points resulting in higher space/time yields and/or in a prolonged lifetime of the catalyst. It is especially advantageous to use an eutectic mixture (melting point: 210°C) prepared from potassium acetate (melting point: 292°C) and sodium acetate (melting point: 324°C).

The improved space/time yields and the increased lifetime of catalysts impregnated in the manner set forth above are facts of considerable commercial significance. These effects are illustrated in Examples 10 and 11 below.

The following Examples illustrate both the preparation and use of the catalyst according to this invention:

EXAMPLE 1:

One kg silicic acid strands 3 mm wide were mixed with an aqueous solution containing 10 grams Pd in the form of $PdCl_2$ and 0.4 grams Au in the form of $H[AuCl_4]$, and thoroughly impregnated. The whole was dried then with agitation and the dried mass was slowly introduced at 40°C into a solution which contained about 3 percent hydrazine hydrate. The palladium chloride and the chloroauric acid underwent immediate reduction accompanied by the evolution of nitrogen. When the reduction was complete, supernatant water was poured off, the whole was after-washed with distilled water, and the moist catalyst was introduced into an about 10 percent solution of sodium acetate. Supernatant sodium acetate solution was removed by decantation and the catalyst was dried in vacuo at about 60°C. The catalyst so prepared contained about 1 % Pd, 0.04 % Au (corresponding to 2,13 atom percent gold, referred to the gram atoms palladium plus gold) and 1.8 % Na in the form of $CH_3COONa$. It was found to have a surface of 69 square meters per gram (determined by the BET-method).

EXAMPLE 2

400 cc of the catalyst mass prepared in the manner set forth in Example 1 were placed into an 18/8 chrome-nickel steel tube 25 mm wide in which was placed a chrome-nickel steel core tube which had an external diameter of 14 mm and was intended to receive thermo-resistors for temperature determination, and the catalyst mass was maintained at a temperature of 170°C by gentle heating of the tube in a liquid bath. A gas mixture formed of 90 normal liters (measured at N.T.P.) $C_2H_4$, 50 normal liters air and 100 grams acetic acid was caused to travel under a pressure of six atmospheres absolute through the tube held in upright position. The reaction mixture leaving the reaction tube was cooled down to $-70°C$ to isolate condensable matter, and the condensed matter was analyzed by distillation. Vinyl acetate was initially obtained in a space/time yield of 44 grams and, after four hours, in a constant space/time yield of 50 grams per liter of catalyst per hour.

EXAMPLE 3

The catalyst of Example 1 was used in the manner described in Example 2 save that before it was gassed with the ethylene/acetic acid/air-mixture, it was subjected to an "activating" after-treatment by means of air at 170°C and treated then with nitrogen. Vinyl acetate was initially obtained in a space/time yield of 41 grams, and after some time, in a constant space/time yield of 47 grams per liter of catalyst per hour.

EXAMPLE 4

One kg of a silicic acid carrier in the form of balls having a diameter of 4 mm was mixed with an aqueous solution which contained 8 grams Pd in the form of $PdCl_2$ and 3 grams Au in the form of $H[AuCl_4]$, and thoroughly impregnated. The whole was dried then with agitation in order uniformly to distribute the noble metal salts on the carrier, and the dried mass was slowly introduced at 40°C into an about 4 to 5 percent solution of hydrazine hydrate. Once the noble metal compounds had been reduced, supernatant liquid was poured off, the whole was thoroughly after-washed with distilled water, and the moist catalyst was introduced into a 11.9 percent solution of potassium acetate. Supernatant potassium acetate solution was removed by decantation and the catalyst was dried then in vacuo at 60°C. The catalyst so prepared was found to contain about 0.8 % Pd, 0.3 % Au (corresponding to 16,88 atom percent gold, referred to the gram atoms palladium plus gold) and 2.5 % K in the form of $CH_3COOK$.

350 cc of the catalyst mass were placed into an 18/8 chrome-nickel steel stube having an internal diameter of 25 mm, in which was placed a chrome-nickel steel core tube which had an external diameter of 14 mm and was intended to receive thermo-resistors for temperature determination, and the catalyst mass was maintained at 170°C by gentle heating of the tube. A gas mixture formed of 90 normal liters (measured at N.T.P.) ethylene, 65 normal liters air and 120 grams acetic acid was caused to travel under a pressure of 6 atmospheres absolute through the tube held in upright position. The gas mixture leaving the tube was cooled down to $-70°C$ in order to remove condensable matter, and the condensed matter was analyzed by distilling it. Vinyl acetate was obtained in a space/time yield of 106 grams per liter of catalyst per hour. Within 19 days of operation, the space/time yield was found to decrease to 90 grams vinyl acetate per liter of catalyst per hour. The average daily decrease in catalyst activity was determined to be 0.84 gram vinyl acetate per liter of catalyst per hour.

EXAMPLE 5

A catalyst prepared in the manner set forth in Example 4 save that the potassium acetate solution had been replaced by an 8.1 percent solution of lithium acetate for impregnation was found to produce vinyl acetate in a space-time yield of 87 grams per liter of catalyst per hour under identical reaction conditions. The catalyst contained about 0.8 % Pd, 0.3 % Au and about 1 % Li in the form of $CH_3COOLi$. After 15 days of operation, the catalyst activity decreased to about 46 grams vinyl acetate per liter of catalyst per hour. The average daily decrease in catalyst activity was determined to be 2.73 grams vinyl acetate per liter of catalyst per hour.

EXAMPLE 6

One Kg silicic acid in the form of strands 3 mm wide was mixed with an aqueous solution containing 10 grams Pd in the form of $PdCl_2$ and 12.7 grams Au in the form of $H[AuCl_4]$, and thoroughly impregnated. The whole was dried then with agitation in order uniformly to distribute the noble metal compounds on the carrier. The dried mass was slowly introduced at 40°C into a 3 percent solution of hydrazine hydrate. The palladium chloride and the chloroauric acid underwent immediate reduction accompanied by the evolution of nitrogen. Once the reduction was complete, supernatant water was poured off, the whole was thoroughly after-washed by means of distilled water, and the moist catalyst was introduced into an about 10 percent solution of sodium acetate. Supernatant sodium acetate solution was removed by decantation and the catalyst was dried in vacuo at 60°C. The catalyst so prepared was found to contain about 1 percent by weight Pd, 1.27 percent by weight Au and 1.8 percent by weight Na in the form of $CH_3COONa$. The catalyst contained 40 atom percent gold, referred to the gram atoms palladium plus gold, and was ready for immediate use.

350 cc of the catalyst mass so prepared were placed into an 18/8 chrome-nickel steel tube having an internal diameter of 25 mm, in which was placed a chrome-nickel steel core tube which had an external diameter of 14 mm and was intended to receive thermo-resistors for temperature determination, and the catalyst mass was maintained at 170°C by gentle heating of the tube. A gas mixture formed of 120 grams acetic acid, 90 normal liters (measured at N.T.P.) ethylene and 65 normal liters air was caused to travel under a pressure of six atmospheres absolute through the tube held in upright position. The gas mixture leaving the reaction tube was cooled down to −70°C in order to remove condensable matter, and the condensed matter was analyzed by distilling it. The catalyst so prepared produced vinyl acetate in an initial space/time yield of 83 grams per liter of catalyst per hour which increased within 24 hours to a constant rate of 105 to 110 grams vinyl acetate per liter of catalyst per hour. After 200 hours of operation, the catalyst activity could not be found to have practically decreased.

EXAMPLE 7

A catalyst prepared in the manner set forth in Example 6 and containing 1 percent by weight palladium and 0.79 percent by weight gold (corresponding to 30 atom percent gold; referred to the gram atoms of the two noble metals) produced 120 grams vinyl acetate per liter of catalyst per hour under the conditions set forth in Example 6.

EXAMPLE 8

A catalyst prepared in the manner set forth in Example 6 and containing 1 percent by weight palladium and 1.84 percent by weight gold (corresponding to 50 atom percent gold, referred to the gram atoms of the two noble metals) produced 91 to 93 grams vinyl acetate per liter of catalyst per hour under the conditions set forth in Example 6.

EXAMPLE 9

One Kg of a silicic acid carrier in the form of balls having a diameter of 4 mm was impregnated with an aqueous solution containing 8 grams Pd in the form of $PdCl_2$ and 3 grams Au in the form of $H[AuCl_4]$, and dried with agitation in order uniformly to distribute the noble metal compounds on the carrier. The dried mass was slowly introduced at 40°C into a 4 to 5 percent solution of hydrazine hydrate. When the reduction of the noble metal compounds was complete, supernatant liquid was poured off, the whole was thoroughly washed with distilled water and the moist catalyst was introduced into an about 10 percent solution of sodium acetate. Supernatant sodium acetate solution was removed by decantation and the catalyst was dried then in vacuo at 60°C. The catalyst so prepared was found to contain about 0.8 percent by weight Pd, 0.3 percent by weight Au and about 1.8 % Na in the form of $CH_3COONa$.

350 cc of the catalyst mass so obtained were placed into an 18/8 chrome-nickel steel tube having an internal diameter of 25 mm, in which was placed a chrome-nickel steel core tube which had an external diameter of 14 mm and was intended to receive thermo-resistors for temperature determination, and the catalyst mass was maintained at 170°C by gentle heating of the tube. A gas mixture formed of 120 grams acetic acid, 90 normal liters (measured at N.T.P.) ethylene, and 65 liters air was caused to flow under a pressure of six atmospheres absolute through the tube held in upright position. The gas mixture leaving the reaction tube was cooled down to −70°C to remove condensable matter, and the condensed matter was analyzed by distilling it. The catalyst produced vinyl acetate in an initial space/time yield of 83 grams which increased within 24 hours to 110 grams per liter of catalyst per hour and decreased within 17 days of operation to 70 grams vinyl acetate per liter of catalyst per hour. The average daily decrease in activity was determined to be 2.35 grams vinyl acetate per liter of catalyst per hour.

EXAMPLE 10

A catalyst prepared in the manner set forth in Example 9 save that the 10 percent solution of sodium acetate had been replaced with an 11 percent solution of potassium and sodium acetate (molar ratio of $CH_3COOK : CH_3COONa = 1:1$) for impregnation, produced vinyl acetate in a space/time yield of 116 grams per liter of catalyst per hour under identical conditions. The catalyst contained about 0.8 % Pd, 0.3 % Au, 0.8 % Na in the form of $CH_3COONa$ and 1.5 % K in the form of $CH_3COOK$. This type of catalyst was found to have an especially long lifetime. After 52 days of operation, the catalyst activity still was 110 grams vinyl acetate per liter of catalyst per hour. The average daily decrease in activity was determined to be as low as 0.12 gram vinyl acetate per liter of catalyst per hour.

EXAMPLE 11

A type of catalyst prepared in the manner set forth in Example 9 and containing 0.8 % Pd and 0.3 % Au, which had been after-impregnated with an 11 percent solution of sodium and potassium acetate (molar ratio of $CH_3COONa : CH_3COOK$ of 1:1) and which thus contained about 0.8 % Na in the form of $CH_3COONa$ and about 1.5 % K in the form of $CH_3COOK$, enabled vinyl acetate to be produced in a space/time yield of 146 grams per liter of catalyst per hour. After 18 days of operation, the catalyst could not be found to produce remarkably less good space/time yields. An identical catalyst which, however, had not been impregnated with the alkali metal acetate solution produced no more than 10 to 20 grams vinyl acetate per liter of catalyst per hour.

EXAMPLE 12

For the purpose of comparison only, catalysts a to d specified below were prepared under conditions analogous to those reported in Example 4 above and used under the reaction conditions described therein for vinyl acetate production. As can be seen, metallic iron and nickel failed to produce any promoter effect, whereas metallic chromium produced an insignificant promoter effect only. As compared therewith, catalyst e, which was prepared and used under identical conditions, was found to have a considerably improved productivity for as low a metallic gold content as 14.7 atom percent Au, based upon the total atoms of palladium and gold.

| Catalyst composition in weight % (Carrier: silicic acid, K in the form of $CH_3COOK$) | Catalyst productivity in grams vinyl acetate per liter of catalyst per hour |
|---|---|
| a) 0.5 % Pd; 3 % K | 40 grams per liter per hour |
| b) 0.5 % Pd; 3 % K; 1.3% Fe | 35 - 40 grims per liter per hour |
| c) 0.5 % Pd; 3 % K; 1.3 % Ni | 39.6 grams per liter per hour |
| d) 0.5 % Pd; 3 % K; 1.3 % Cr | 51 grams per liter per hour |
| e) 0.5 % Pd; 3 %K; 0.16 % Au | 93 grams per liter per hour |

We claim:

1. A process for the catalytic vapor phase production of vinyl acetate wherein ethylene, acetic acid and molecular oxygen are passed over a catalyst supported on a carrier said catalyst consisting essentially of 0.1 to 6.0 weight per cent metallic palladium, 1–20 weight per cent of a compound selected from the group consisting of alkali metal formates and acetates and 0.01 to 10 weight per cent metallic gold, said weights being based on the total weight of the catalyst including the carrier.

2. The process of claim 1, wherein the catalyst contains 0.1 to 6.0 percent by weight palladium, 1 to 20 percent by weight of a compound selected from the group consisting of alkali metal formate and alkali metal acetate.

3. The process of claim 1, wherein the catalyst contains a low melting mixture of at least two compounds selected from the group consisting of sodium acetate, potassium acetate, rubidium acetate and cesium acetate.

4. The process of claim 3, wherein the catalyst contains 0.5 to 5 percent by weight each of at least two of said alkali metal acetates.

5. The process of claim 3, wherein the catalyst contains a eutectic mixture of at least two of said alkali metal acetates.

6. The process of claim 3, wherein the catalyst contains sodium acetate and potassium acetate in a molar ratio of about 1 to 1.

7. The process of claim 1, wherein the catalyst support material is silicic acid.

8. A process for the catalytic vapor phase production of vinyl acetate which comprises passing ethylene, acetic acid and oxygen over a catalyst supported on a carrier, said catalyst consisting essentially of metallic palladium, an alkali metal acetate or formate and from about 1 to about 40 atom percent metallic gold based on the total weight of palladium and gold.

* * * * *

UNITED STATES PATENT OFFICE
CERTIFICATE OF CORRECTION

Patent No. 3,761,513      Dated September 25, 1973

Inventor(s) Sennewald et al.

It is certified that error appears in the above-identified patent and that said Letters Patent are hereby corrected as shown below:

Column 1, line 38, delete "; the";

Column 9, lines 6 to 10, cancel Claim 2.

Signed and sealed this 10th day of September 1974.

(SEAL)
Attest:

McCOY M. GIBSON, JR.
Attesting Officer

C. MARSHALL DANN
Commissioner of Patents